(12) United States Patent
Kane et al.

(10) Patent No.: US 12,541,320 B2
(45) Date of Patent: *Feb. 3, 2026

(54) PLANE BALANCING IN A MEMORY SYSTEM

(71) Applicant: Micron Technology, Inc., Boise, ID (US)

(72) Inventors: John J. Kane, Westminster, CO (US); Byron D. Harris, Mead, CO (US); Vivek Shivhare, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,452

(22) Filed: Apr. 30, 2024

(65) Prior Publication Data

US 2024/0302991 A1    Sep. 12, 2024

Related U.S. Application Data

(63) Continuation of application No. 17/864,192, filed on Jul. 13, 2022, now Pat. No. 11,995,345.

(60) Provisional application No. 63/348,298, filed on Jun. 2, 2022.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2013/0159601 A1 | 6/2013 | Lassa et al. | |
| 2017/0003880 A1 | 1/2017 | Fisher et al. | |
| 2020/0285393 A1 | 9/2020 | Lin | |
| 2022/0197534 A1 | 6/2022 | Ock | |
| 2022/0404966 A1 | 12/2022 | Kanno et al. | |
| 2023/0069159 A1 | 3/2023 | Huang et al. | |

FOREIGN PATENT DOCUMENTS

CN    114661224 A    6/2022

*Primary Examiner* — Kevin Verbrugge
(74) *Attorney, Agent, or Firm* — Holland & Hart LLP

(57) ABSTRACT

Methods, systems, and devices for plane balancing in a memory system are described. A memory system may select a memory die for writing a set of data. The memory die may include a plurality of planes each of which may include a respective plurality of blocks of memory cells. Based on selecting the memory die, the memory system may determine a first plane of the plurality of planes that has a first quantity of blocks with an availability status and a second plane of the plurality of planes that has a second quantity of blocks with the availability status. The memory system may write the set of data to the plurality of planes, excluding at least the first plane, based at least in part on the first quantity of blocks and the second quantity of blocks.

20 Claims, 7 Drawing Sheets

PLANE BALANCING IN A MEMORY SYSTEM

CROSS REFERENCE

The present application for patent is a Continuation of U.S. patent application Ser. No. 17/864,192 by Kane et al., entitled "PLANE BALANCING IN A MEMORY SYSTEM," filed Jul. 13, 2022, which claims the benefit of U.S. Provisional Patent Application No. 63/348,298 by Kane et al., entitled "PLANE BALANCING IN A MEMORY SYSTEM," filed Jun. 2, 2022, each of which is assigned to the assignee hereof, and each of which is expressly incorporated by reference herein.

FIELD OF TECHNOLOGY

The following relates to one or more systems for memory, including plane balancing in a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may include one or more memory dies each of which may include multiple planes of blocks, where a block may include memory cells. If the memory system has data for transfer to a memory die, the memory system may select an available block from each plane of the memory die and write the data to the selected blocks, where an available block is a block that has been erased or that stores invalid data. But in some cases, the planes of a memory die may be imbalanced in that the planes may have different quantities of available blocks and unavailable blocks, where an unavailable block refers to a block that stores valid data or is marked for avoidance (e.g., due to unreliability). These imbalanced planes may result in inconsistent access performance and may limit parallel access operations as the memory die fills up, which in turn may negatively impact system performance, among other disadvantages.

According to the techniques described herein, a memory system may improve system performance by using transfer operations to better balance planes of a memory die. For example, if one or more of the planes in a memory die has fewer available blocks than the other planes in the memory die, the memory system may avoid the one or more planes during a transfer operation and write to the other planes instead. Thus, the quantity of unavailable blocks in the other planes may increase while the quantity of unavailable blocks in the one or more planes (and by extension the related blocks) avoided remain the same, which may improve the overall balance of the planes, among other advantages.

Figure 1:
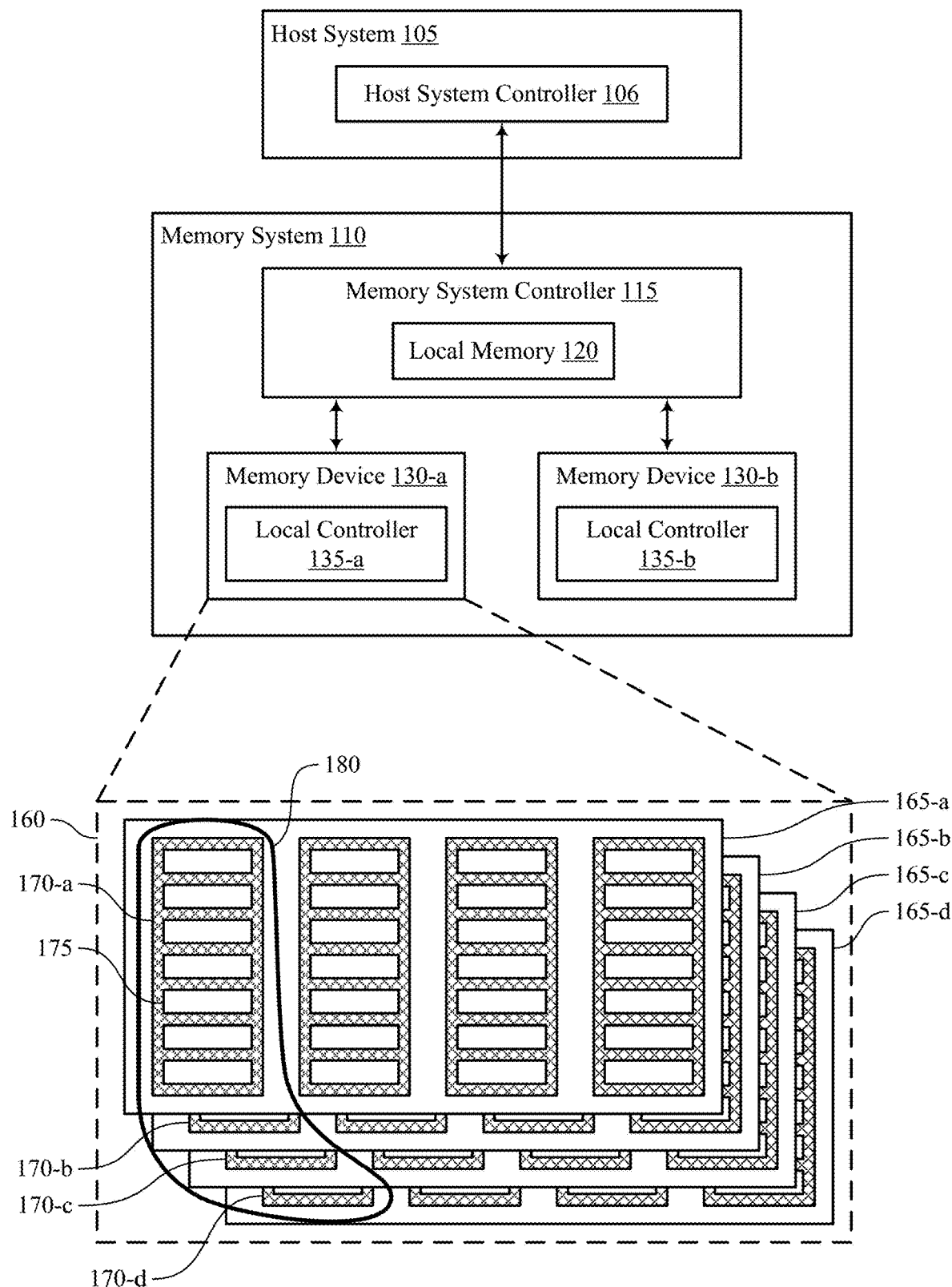
FIG. 1 illustrates an example of a system that supports plane balancing in a memory system in accordance with examples as disclosed herein.

Features of the disclosure are initially described in the context of systems, devices, and circuits with reference to FIG. 1. Features of the disclosure are described in the context of a memory die and process flow with reference to FIGS. 2 and 3. These and other features of the disclosure are further illustrated by and described in the context of an apparatus diagram and flowchart that relate to plane balancing in a memory system with reference to FIGS. 4 through 7.

FIG. 1 illustrates an example of a system 100 that supports plane balancing in a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-

MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples (e.g., in zoned name space (ZNS) systems), the memory cells in the memory system 110 may divided (e.g., logically) into zones. In such examples, access operations, maintenance operation, or both, may be performed on a zone basis, and management of maintenance operations (e.g., wear-leveling, garbage collection, refresh) may be split between the memory system 110 and the host system 105. A zone may be equal to a block or may be a different size than a block (e.g., a zone may be equal to two or more blocks).

The memory system 110 may include lower density blocks and higher density blocks. For instance, the memory system 110 may include single-level cell (SLC) blocks and multiple-level cell (MLC) blocks. An SLC block refers to a block with memory cells configured as single-level cells that are configured to store a single bit of information. An MLC block refers to a block with memory cells configured as multiple-level cells that are configured to store multiple bits of information. Examples of multiple-level cells include bi-level cells (BLCs) which may be configured to each store two bits of information, tri-level cells (TLCs) which may be configured to each store three bits of information, and quad-level cells (QLCs) which may be configured to each store four bits of information. In general, a memory cell that is configured to store n bits may be configured to support $2^n$ levels. Multiple-level cells may provide greater density of storage relative to single-level cells but may, in some cases, involve narrower read or write margins.

As referred to herein, the terms "lower density block" and "higher density block" may be used to refer to the relative quantity of bits the memory cells in the respective blocks are configured to store. So, a block with memory cells each configured to store x bits and a block with memory cells each configured to store y bits may be referred to as a lower density block and a higher density block, respectively, if x<y. Accordingly, BLC blocks may be referred to as lower density blocks relative to TLC blocks and QLC blocks and may be referred to as higher density blocks relative to SLC blocks. Similarly, TLC blocks may be referred to as lower density blocks relative to QLC blocks and may be referred to as higher density blocks relative to SLC blocks and BLC blocks.

Due to differences in access margins, latency, and reliability between lower density blocks and higher density blocks, the memory system 110 may use lower density blocks as caches for higher density blocks. For example, the memory system 110 may accumulate data in the lower density blocks and intermittently transfer the data from the lower density blocks to the higher density blocks. So the memory system 110 may implement transfer operations that transfer data from lower density blocks (e.g., SLC blocks) to higher density blocks (e.g., QLC blocks). Such transfer operations may be referred to as migration operations.

In addition to performing transfer operations from lower density blocks to higher density blocks (e.g., migration operations), the memory system 110 may perform transfer operations between blocks of the same density. For example, the memory system 110 may perform a refresh operation in which the data in the set of blocks is copied to a different set of blocks of the same density. The memory system 110 may use refresh operations to maintain or improve the reliability of data, which may otherwise become corrupted over time. In some examples, the memory system 110 may also perform transfer operations from higher density blocks to lower density blocks. So, the memory system 110 may perform various types of transfer operations.

As part of a transfer operation (e.g., a migration operation, a refresh operation), the memory system 110 may select one of the memory dies 160 as the recipient memory die for the data involved in the transfer operation. The memory system 110 may also select a block from each plane of the memory die 160 for the data so that the memory system 110 can write to the blocks in parallel (e.g., concurrently, at partially or wholly overlapping times), an operation referred to as a parallel write or a parallel program. Parallel writes may be more efficient than serial writes that involve a single plane, and parallel writes to higher quantities of planes may be more efficient than parallel writes to lower quantities of planes. For example, a quad-plane parallel write (e.g., a parallel write to four planes) may be more efficient than a tri-plane parallel write (e.g., a parallel write to three planes), and so on and so forth.

In other systems, the memory system may select a block from each plane of a memory die for a data transfer. But indiscriminately writing the data to a block from each plane may perpetuate an imbalance between planes, the existence of which may negatively impact the performance of the system. For example, imbalanced planes may be associated with inconsistent access metrics. Further, as the memory die reaches capacity, imbalanced planes may concentrate reduced-efficiency write operations (e.g., serial write operations or reduced plane parallel write operations) by preventing higher-efficiency write operations (e.g., parallel write operations).

According to the techniques described herein, the memory system 110 may reduce an imbalance between planes of a memory die 160 by avoiding one or more planes (e.g., the most imbalanced plane(s)) during a transfer operation. For example, the memory system 110 may identify the plane(s) with the fewest available blocks and avoid the plane(s) during the transfer operation. By balancing the planes in such a manner, the memory system 110 may increase the consistency of access operations and distribute lower-efficiency writes as the memory die 160 is filled, which may improve performance compared to concentrating lower-efficiency writes as the memory die 160 nears capacity.

In some examples, the memory system 110 may use the severity of the imbalance as a condition for avoiding planes, which may prevent over-use of the avoidance technique. For instance, the memory system 110 may avoid an imbalanced plane if the difference between the quantity of used blocks of the plane and the quantity of used blocks of the plane with the highest quantity of used blocks satisfies a threshold.

The system 100 may include any quantity of components, such as non-transitory computer readable media, that support plane balancing in a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
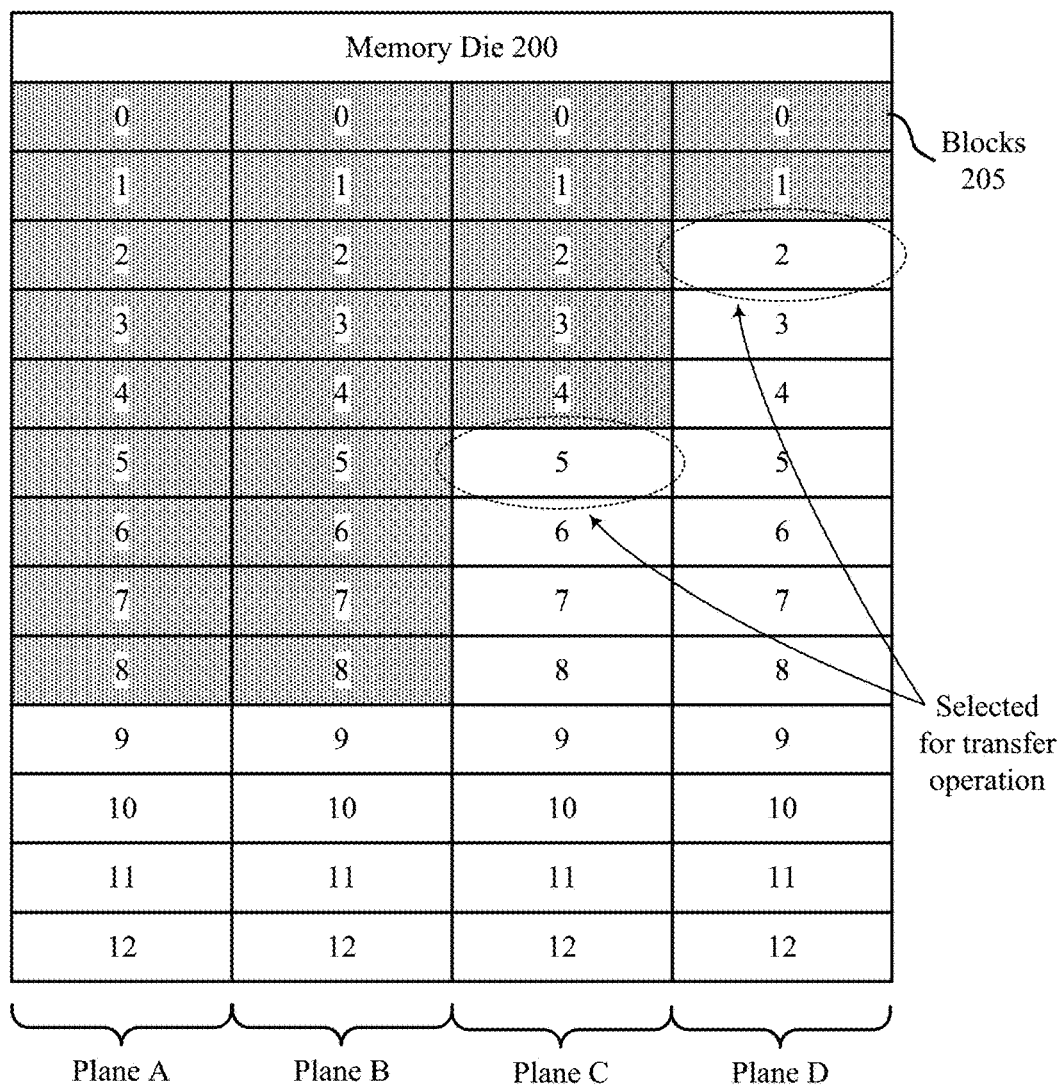
FIG. 2 illustrates an example of a memory die that supports plane balancing in a memory system in accordance with examples as disclosed herein.

FIG. 2 illustrates an example of a memory die 200 that supports plane balancing in a memory system in accordance with examples as disclosed herein. The memory die 200 may be an example of a memory die 160 as described with reference to FIG. 1. The memory die 200 may include multiple planes, such as plane A, plane B, plane C, and plane D. Each plane may include multiple blocks 205, indexed 0 through 12. Other quantities of planes and blocks are contemplated and within the scope of the present disclosure. According to the techniques described herein, a memory system that includes the memory die 200 may balance the planes by identifying and avoiding one or more imbalanced planes during a transfer operation. In some examples, the memory die 200 may be included in a ZNS system that manages access operations and maintenance operations on a zone basis. In such examples, a zone may be equal to or may include a block, multiple blocks, or a portion of a block.

In some examples, the blocks 205 may be QLC blocks. However, in other examples the blocks 205 may be SLC blocks, BLC blocks, TLC blocks, or blocks of other densities. Although shown with blocks 205, the memory die 200 may include additional blocks of the same or other densities. For example, if the blocks 205 are QLC blocks, the memory die 200 may include additional blocks that are SLC blocks.

The blocks 205 of a plane may have different availability statuses. For example, a plane may include blocks that are available for writing (which may be referred to as available blocks) and blocks that are unavailable for writing (which may be referred to as unavailable blocks). An available block may be block that has been erased or a block that stores invalid data that the memory die is permitted to erase before performing a write operation on the block. An unavailable block may be a block that stores valid data or that is listed as a block to avoid accessing (e.g., an unreliable block). Valid data may refer to up-to-date data and invalid data may refer to out-of-date or inaccurate data.

In some examples, the planes of the memory die 200 may be imbalanced in that different planes may have different quantities of available block and unavailable blocks. For example, plane A and plane B may each have nine unavailable blocks and four available blocks (which may be referred to as a 9:4 ratio of unavailable blocks to available blocks); plane C may have five unavailable blocks and eight available blocks (e.g., a 5:8 ratio); and plane D may have two unavailable blocks and 11 available blocks (e.g., a 2:11 ratio). The planes may be imbalanced due to various maintenance operations initiated by a host system, or for other reasons. For example, the host system may initiate maintenance operations that invalidate data in blocks 205 of the memory die 200 or that erase blocks of the memory die 200, resulting in imbalanced planes.

To prevent or reduce imbalances between the planes, the memory die 200 may use the techniques described herein to avoid one or more blocks 205 during a transfer operation. For example, instead of writing data to each plane of the memory die 200 during a transfer operation, the memory die 200 may avoid one or more planes and write data to the remaining planes (e.g., the other planes of the memory die 200). To illustrate, rather than writing data to each of plane A, plane, B, plane C, and plane D, the memory die 200 may avoid one or more both of plane A and plane B and write data to one or both of plane C and plane D. Thus, the memory die 200 may exclude one or more planes for writing data during a transfer operation.

The memory die 200 may determine which plane(s) to avoid for a data transfer based on the availability statuses of the blocks in the planes, among other factors. For example, the memory die 200 may select for avoidance the plane(s) with the highest quantity of unavailable blocks, which may also be the planes that have the lowest quantity of available blocks. Put another way, the memory die 200 may select for avoidance the plane(s) with the highest ratio of unavailable blocks to available blocks, which may also be the plane(s) with the lowest ration of available blocks to unavailable blocks. Thus, the memory die 200 may avoid plane A and plane B during a transfer operation and write data only to plane C and plane D. For example, the memory die 200 may write data to block 5 of plane C and to block 2 of plane D and may refrain from writing data to plane A and plane B.

In some examples, the memory die 200 may determine whether to avoid plane(s) for a data transfer based on the severity of the imbalance between the planes. For instance, the memory die 200 may compare the quantity of available blocks in the plane with the highest quantity of available blocks (e.g., plane D) to the quantity of available blocks in the plane with the lowest quantity of available blocks (e.g., plane A, plane B). If the difference between the highest quantity of available blocks and the lowest quantity of available blocks satisfies a threshold, the memory die 200 may avoid the plane(s) with the lowest quantity of available blocks. In a similar example, the memory die 200 may compare the quantity of unavailable blocks in the plane with the highest quantity of unavailable blocks (e.g., plane A, plane B) to the quantity of unavailable blocks in the plane with the lowest quantity of unavailable blocks (e.g., plane D). If the difference between the highest quantity of unavailable blocks and the lowest quantity of unavailable blocks satisfies a threshold, the memory die 200 may avoid the planes(s) with the highest quantity of unavailable blocks. In a similar example, the memory die 200 may compare the highest and lowest ratios of available blocks and unavailable blocks and avoid the planes based on the comparison.

The data involved in a transfer operation may be data from the same memory die (e.g., memory die 200) or data from a different memory die. That is, the transfer operation may be an intra-die transfer operation (e.g., a transfer operation that moves data within a memory die) or an inter-die transfer operation (e.g., a transfer operation that moves data between memory dies). Additionally, the transfer operation may be any type of transfer operation, include a migration operation or a refresh operation. In a migration operation, the data involved in the transfer may be transferred from lower density blocks (e.g., SLC blocks) to higher density blocks (e.g., QLC blocks), or vice versa. In a refresh operation, the data involved in the transfer may be transferred between blocks of equal densities (e.g., between QLC blocks, between SLC blocks).

Thus, the memory die 200 may better balance the planes of a memory die by identifying and avoiding one or more imbalanced planes during a transfer operation.

Figure 3:
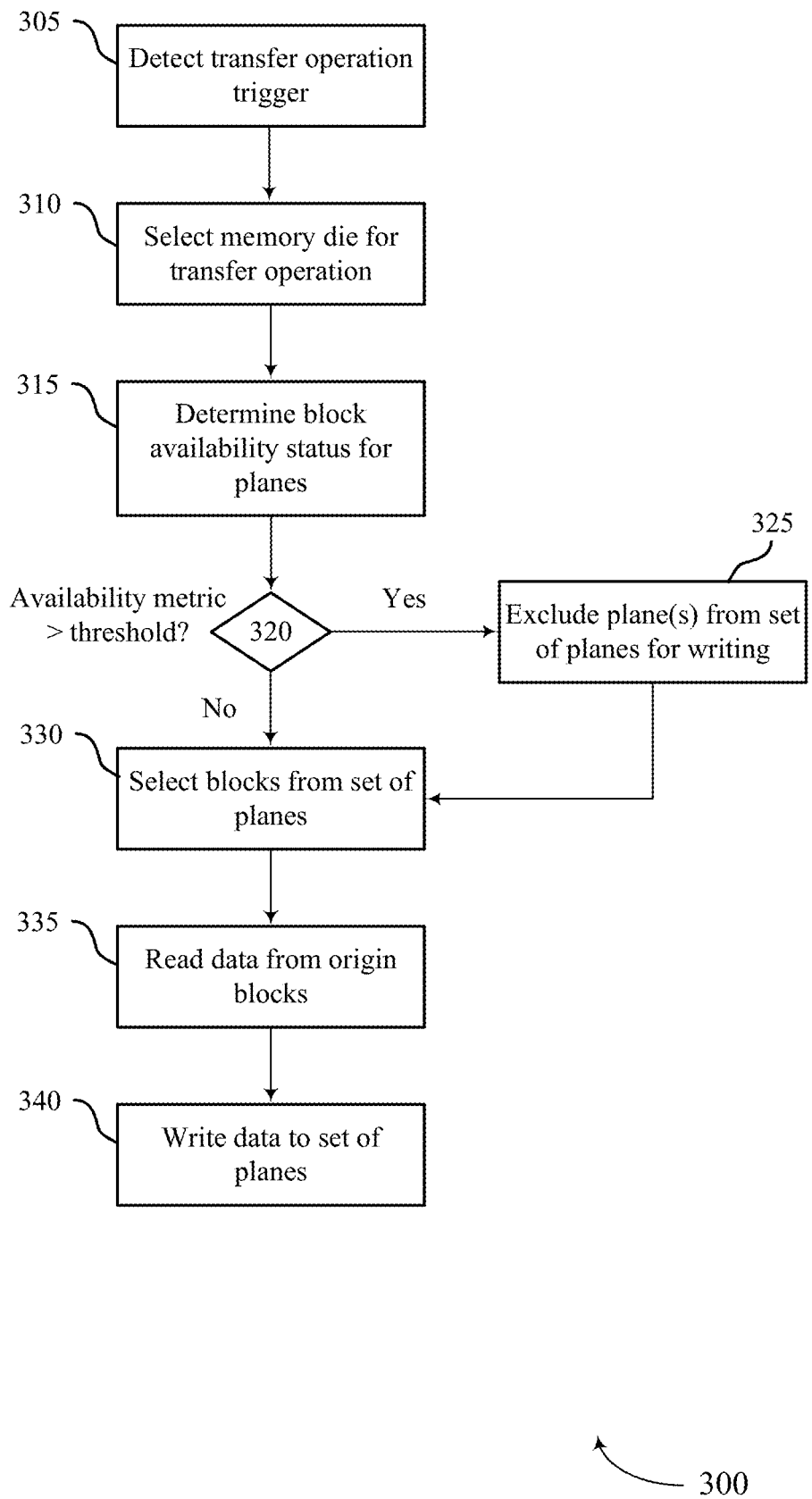
FIG. 3 illustrates an example of a process flow that supports plane balancing in a memory system in accordance with examples as disclosed herein.

FIG. 3 illustrates an example of a process flow 300 that supports plane balancing in a memory system in accordance with examples as disclosed herein. The process flow 300 may be implemented by a device such as a memory device, a memory die, or a memory system described herein. The device may include a memory die that has multiple planes, each of which may include blocks of memory cells. Implementation of the process flow 300 may allow the device to improve performance by balancing the planes of the memory die, which may involve excluding one or more planes of the memory die from a transfer operation. In some examples, the process flow 300 may be implemented by a ZNS memory system.

The transfer operation described in process flow 300 may be a migration operation, a refresh operation, or other type or transfer operation. Further, the transfer operation may be between blocks of the same density or between blocks with different densities, among other characteristics.

At 305, the device may detect a trigger for a transfer operation for a set of data. For example, the device may determine that the set of data is ready for a refresh operation or a migration operation. At 310, the device may select a memory die for the transfer operation. In some examples, the device may select the memory die based on capacity of the memory die relative to other memory dies. For example, the device may select the memory die based on the memory die having more available capacity than other memory dies.

At 315, the device may determine the availability statuses for blocks in the planes of the memory die. For example, the device may determine the quantity of available planes in each plane of the memory die, the quantity of unavailable planes in each plane of the memory die, the percentage of available blocks per plane, the percentage of unavailable blocks per plane, or any combination thereof. Thus, the device may determine the plane(s) with the lowest quantity of available block, the plane(s) with the highest quantity of available blocks, the plane(s) with the lowest quantity of unavailable blocks, the plane(s) with the highest quantity of unavailable blocks, or any combination thereof, among other metrics that are a function of said quantities.

For instance, the system may determine the plane(s) with the highest percentage of available blocks, the plane(s) with the lowest percentage of available blocks, the plane(s) with the highest percentage of unavailable blocks, the plane(s) with the lowest percentage of unavailable blocks or any combination thereof. In another example, the system may determine the plane(s) with the highest ratio of unavailable blocks to available blocks (or vice versa), the plane(s) with the lowest ratio of unavailable blocks to available blocks (or vice versa), or any combination thereof.

At 320, the system may determine whether an availability metric satisfies (e.g., exceeds) a threshold. The availability metric may be based on the quantity of available blocks, the quantity of unavailable blocks, or both, for one or more planes. In one example, the availability metric may be the difference between the lowest quantity of available blocks (given by the plane with the lowest quantity of available blocks) and the highest quantity of available blocks (given by the plane with the highest quantity of available blocks). In another example, the availability metric may be the difference between the highest quantity of unavailable blocks (given by the plane with the highest quantity of unavailable blocks) and the lowest quantity of unavailable blocks (given by the plane with the lowest quantity of unavailable blocks). In another example, the availability metric may be the percentage of available blocks or the percentage of unavailable blocks. In another example, the availability metric may be the ratio of available blocks to unavailable blocks, or vice versa.

If, at 320, the system determine that the availability metric does not satisfy the threshold, the system may proceed to 330.

If, at 320, the system determine that the availability metric satisfies the threshold, the system may proceed to 325. At 325, the system may exclude one or more planes from a set of planes for writing the data involved in the transfer operation. In some examples, the system may exclude the plane(s) with the lowest quantity of available blocks (or the plane with the highest quantity of unavailable blocks) from the set of planes. In other examples, the system may exclude the plane(s) that percentages of available blocks (or percentages of unavailable blocks) that satisfy the threshold. In other examples, the system may exclude the plane(s) that have ratios of available blocks to unavailable blocks, or vice versa, that satisfy the threshold. Thus, the set of planes selected for the transfer operation may be the planes of the memory die minus one or more planes excluded at 325.

If multiple plane have availability metrics that satisfy the threshold for exclusion, the system may exclude one or more of the multiple planes based on the quantity of planes in the memory die. For example, if multiple planes have the lowest quantity of available blocks (or the highest quantity of unavailable blocks), the system may exclude one or more of the multiple planes based on the quantity of the multiple planes and based on the quantity of planes in the memory die. For instance, to preserve efficiency, the system may exclude up to, but no more than, x % (e.g., 50%) of the planes in the memory die.

At 330, the system may select blocks from the set of planes selected for the transfer operation. The system may select one block per plane so that the system can perform parallel write operations on the planes. In some examples, the blocks selected may be based on the quantity of access operations performed on the blocks. For example, within a given plane, the memory system may select the block that has been subject to the fewest quantity of access operations (e.g., write operations, erase operations).

At 335, the system may read data for the transfer operation from a set of blocks. The set of blocks may have the same density as the blocks selected at 330 or the set of blocks may have a different density than the blocks selected at 300. For example, in a migration operation, the set of blocks may be SLC blocks and the blocks selected at 330 may be QLC blocks. In a refresh operation, the set of blocks may be QLC blocks and the blocks selected at 330 may also be QLC blocks. Other types of transfer operations involving other combinations of densities are contemplated and within the scope of the present disclosure.

At 340, the system may write the data to the set of planes as part of the transfer operation. For example, the system may write the data to the blocks selected from the set of planes for the transfer operation. So, the system may write the data to the planes of the memory die minus any plane(s) excluded at 325.

Thus, the system may balance the planes of the memory die by excluding one or more planes of the memory die from a transfer operation.

Figure 4:
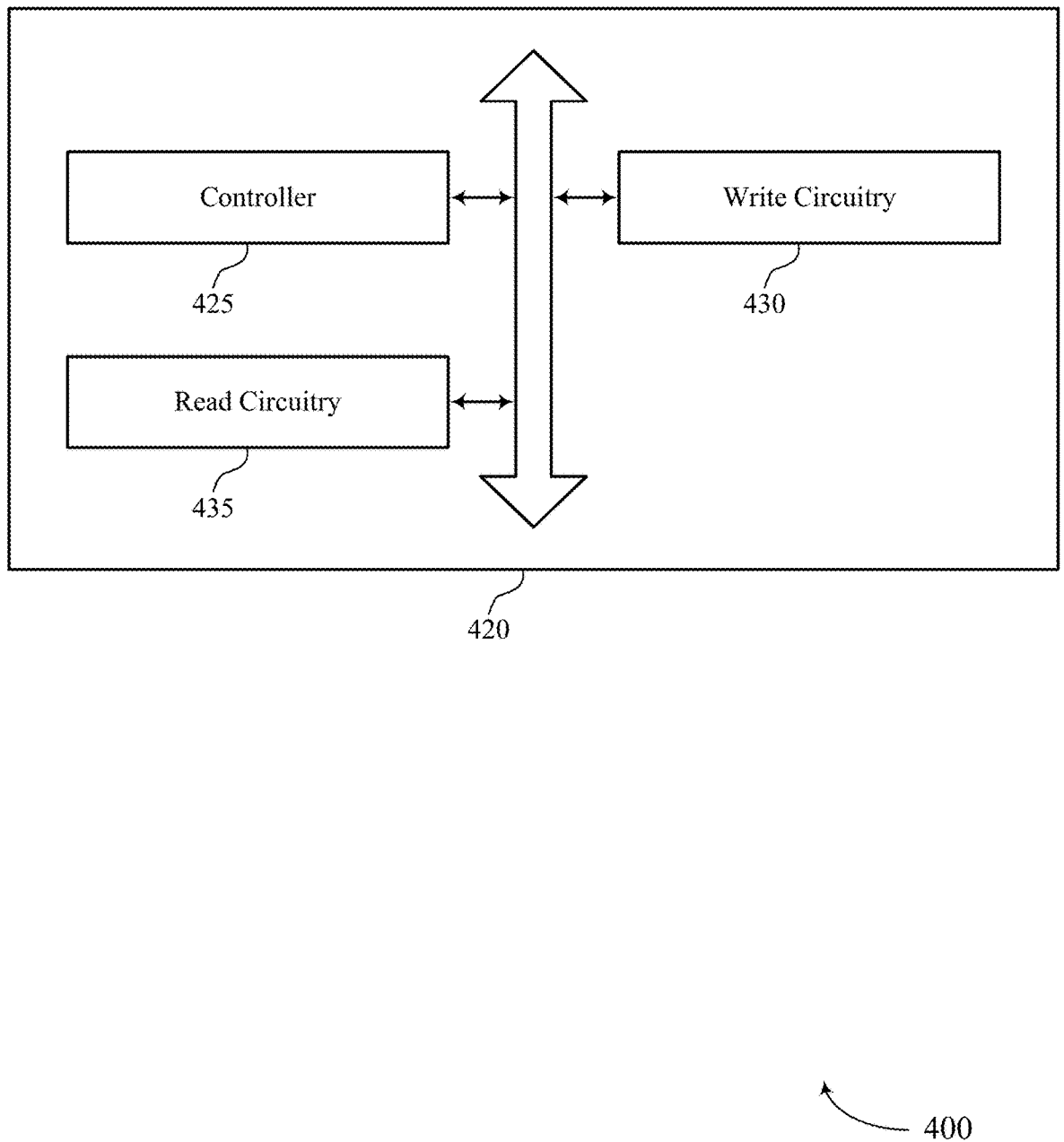
FIG. 4 shows a block diagram of a memory system that supports plane balancing in a memory system in accordance with examples as disclosed herein.

FIG. 4 shows a block diagram 400 of a memory system 420 that supports plane balancing in a memory system in accordance with examples as disclosed herein. The memory system 420 may be an example of aspects of a memory system as described with reference to FIGS. 1 through 3. The memory system 420, or various components thereof, may be an example of means for performing various aspects of plane balancing in a memory system as described herein. For example, the memory system 420 may include a controller 425, a write circuitry 430, a read circuitry 435, or any combination thereof. Each of these components may communicate, directly or indirectly, with one another (e.g., via one or more buses).

The controller 425 may be configured as or otherwise support a means for selecting a memory die for writing a set of data, the memory die including a plurality of planes each including a respective plurality of blocks of memory cells. In some examples, the controller 425 may be configured as or otherwise support a means for determining, based at least in part on selecting the memory die, a plane of the plurality of planes that has a lowest quantity of blocks available for writing relative to the other planes in the plurality of planes. The write circuitry 430 may be configured as or otherwise support a means for writing the set of data to a subset of the plurality of planes that excludes at least the plane based at least in part on the plane having the lowest quantity of blocks available for writing.

In some examples, a block that is available for writing includes a block that is in an erased state or that stores invalid data.

In some examples, the controller 425 may be configured as or otherwise support a means for determining a second plane of the plurality of planes that has a highest quantity of blocks available for writing relative to the other planes in the plurality of planes, where the plane is excluded from writing the set of data based at least in part on a difference between the lowest quantity and the highest quantity satisfying a threshold.

In some examples, the controller 425 may be configured as or otherwise support a means for determining, based at least in part on selecting the memory die, a second plane of the plurality of planes that has the lowest quantity of blocks available for writing, where the second plane is excluded from the subset of the plurality of planes for writing the set of data based at least in part on the second plane having the lowest quantity of blocks available for writing.

In some examples, the controller 425 may be configured as or otherwise support a means for determining a second plane of the plurality of planes that has the lowest quantity of blocks available for writing, where the second plane is included in the subset of the plurality of planes for writing the set of data based at least in part on a quantity of the plurality of planes of the memory die.

In some examples, the controller 425 may be configured as or otherwise support a means for determining a second plane of the plurality of planes that has a second lowest quantity of blocks available for writing relative to the other planes in the plurality of planes, where the second plane is excluded from the subset of the plurality of planes for writing the set of data based at least in part on the second plane having the second lowest quantity of blocks available for writing.

In some examples, the controller 425 may be configured as or otherwise support a means for selecting a set of blocks for writing the set of data based at least in part on plane having the lowest quantity of blocks available for writing, the set of blocks including a block from each plane in the subset of the plurality of planes that excludes at least the plane.

In some examples, the set of blocks includes blocks with memory cells each of which is configured for storing a first quantity of bits, and the read circuitry 435 may be configured as or otherwise support a means for reading the set of data from a second set of blocks including memory cells each of which is configured for storing a second quantity of bits.

In some examples, the set of blocks include blocks with memory cells each of which is configured for storing a first quantity of bits, and the read circuitry 435 may be configured as or otherwise support a means for reading the set of data from a second set of blocks including memory cells each of which is configured for storing the first quantity of bits. In some examples, the memory die is included in a ZNS memory system.

In some examples, the controller 425 may be configured as or otherwise support a means for selecting a memory die for writing a set of data, the memory die including a plurality of planes each including a respective plurality of blocks of memory cells. In some examples, the controller 425 may be configured as or otherwise support a means for determining, based at least in part on selecting the memory die, a plane of the plurality of planes that has a highest quantity of blocks unavailable for writing relative to the other planes in the plurality of planes. In some examples, the write circuitry 430 may be configured as or otherwise support a means for writing the set of data to a subset of the plurality of planes that excludes least the plane based at least in part on the plane having the highest quantity of blocks unavailable for writing.

In some examples, a block that is unavailable for writing includes a block that stores valid data or that is included in a list of blocks to avoid accessing.

In some examples, the controller 425 may be configured as or otherwise support a means for determining a second plane of the plurality of planes that has a lowest quantity of blocks unavailable for writing relative to the other planes in the plurality of planes, where the plane is excluded from writing the set of data based at least in part on a difference between the lowest quantity and the highest quantity satisfying a threshold.

In some examples, the controller 425 may be configured as or otherwise support a means for determining, based at least in part on selecting the memory die, a second plane of the plurality of planes that has the highest quantity of blocks unavailable for writing, where the second plane is excluded from the subset of the plurality of planes for writing the set of data based at least in part on the second plane having the highest quantity of blocks unavailable for writing.

In some examples, the controller 425 may be configured as or otherwise support a means for determining a second plane of the plurality of planes that has the highest quantity of blocks unavailable for writing, where the second plane is included in the subset of the plurality of planes for writing the set of data based at least in part on a quantity of the plurality of planes of the memory die.

In some examples, the controller 425 may be configured as or otherwise support a means for determining a second plane of the plurality of planes that has a second highest quantity of blocks unavailable for writing relative to the other planes in the plurality of planes, where the second plane is excluded from the subset of the plurality of planes for writing the set of data based at least in part on the second plane having the second highest quantity of blocks unavailable for writing.

In some examples, the controller 425 may be configured as or otherwise support a means for selecting a set of blocks for writing the set of data based at least in part on plane having the highest quantity of blocks unavailable for writing, the set of blocks including a block from each plane in the subset of the plurality of planes that excludes at least the plane.

In some examples, the set of blocks includes blocks with memory cells each of which is configured for storing a first quantity of bits, and the read circuitry 435 may be configured as or otherwise support a means for reading the set of data from a second set of blocks including memory cells each of which is configured for storing a second quantity of bits.

In some examples, the set of blocks include blocks with memory cells each of which is configured for storing a first quantity of bits, and the read circuitry 435 may be configured as or otherwise support a means for reading the set of data from a second set of blocks including memory cells each of which is configured for storing the first quantity of bits.

In some examples, the controller 425 may be configured as or otherwise support a means for selecting a memory die for writing a set of data, the memory die including a plurality of planes each including a respective plurality of blocks of memory cells. In some examples, the controller 425 may be configured as or otherwise support a means for determining, based at least in part on selecting the memory die, a first plane of the plurality of planes that has a first quantity of blocks with an availability status and a second plane of the plurality of planes that has a second quantity of blocks with the availability status. In some examples, the write circuitry 430 may be configured as or otherwise support a means for writing the set of data to the plurality of planes, excluding at least the first plane, based at least in part on a difference between the first quantity of blocks and the second quantity of blocks satisfying a threshold.

In some examples, the availability status includes the blocks being available for writing. In some examples, a block is available for writing if the block is in an erased state or stores invalid data.

In some examples, the availability status includes the blocks being unavailable for writing. In some examples, a block is unavailable for writing if the block stores valid data or is included in a list of blocks to avoid accessing.

In some examples, the controller 425 may be configured as or otherwise support a means for excluding a third plane of the plurality of planes from writing the set of data based at least in part on a difference between a third quantity of blocks of the third plane with the availability status and the second quantity of blocks satisfying the threshold.

In some examples, the controller 425 may be configured as or otherwise support a means for selecting a set of blocks for writing the set of data based at least in part on plane having the highest quantity of blocks unavailable for writing, the set of blocks including a block from each plane of the plurality of planes except for the plane.

In some examples, the set of blocks includes blocks with memory cells each of which is configured for storing a first quantity of bits, and the read circuitry 435 may be configured as or otherwise support a means for reading the set of data from a second set of blocks including memory cells each of which is configured for storing a second quantity of bits.

In some examples, the set of blocks includes blocks with memory cells each of which is configured for storing a first quantity of bits, and the read circuitry 435 may be configured as or otherwise support a means for reading the set of data from a second set of blocks including memory cells each of which is configured for storing the first quantity of bits.

Figure 5:
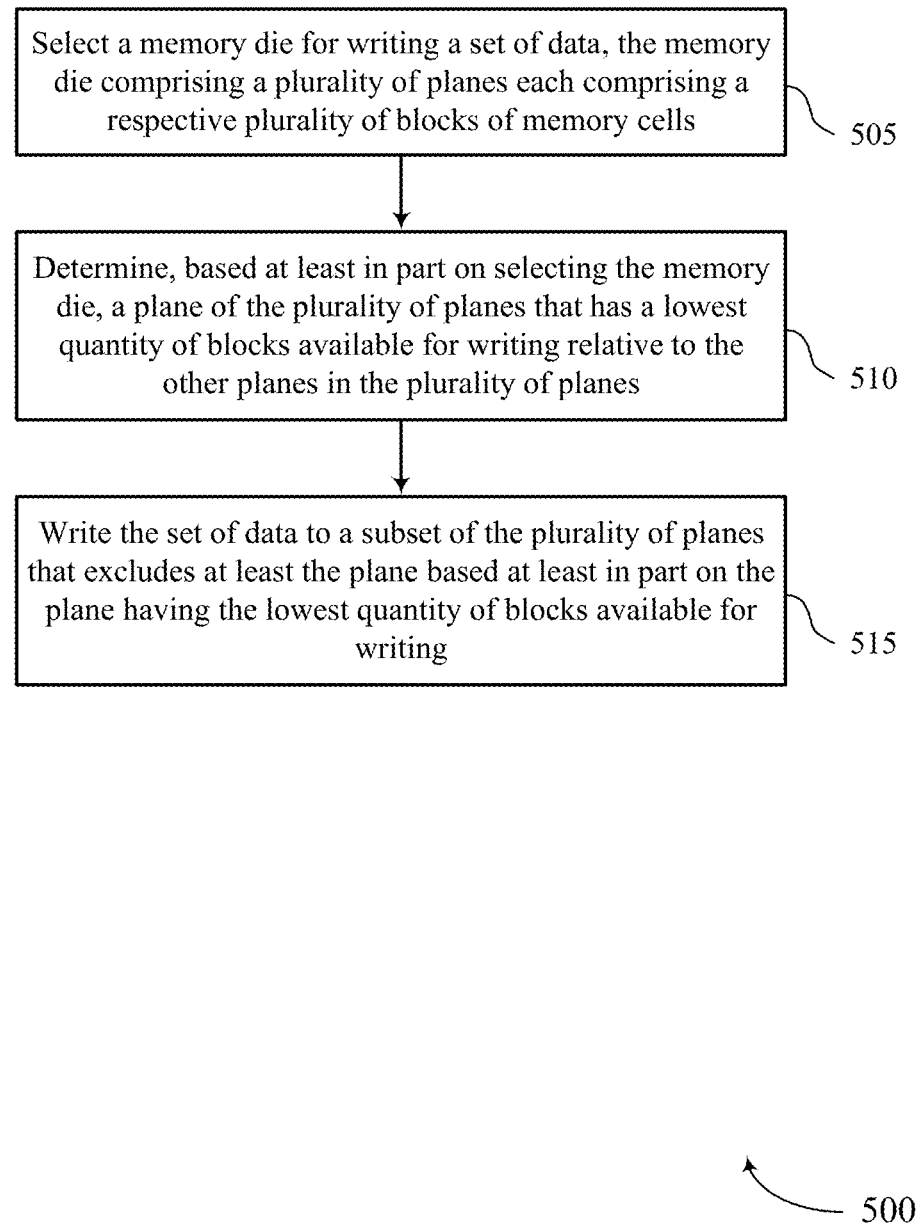
FIGS. 5 through 7 show flowcharts illustrating a method or methods that support plane balancing in a memory system in accordance with examples as disclosed herein.

FIG. 5 shows a flowchart illustrating a method 500 that supports plane balancing in a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include selecting a memory die for writing a set of data, the memory die including a plurality of planes each including a respective plurality of blocks of memory cells. The operations of 505 may be performed in accordance with examples as disclosed herein. In some examples, aspects of the operations of 505 may be performed by a controller 425 as described with reference to FIG. 4.

At 510, the method may include determining, based at least in part on selecting the memory die, a plane of the plurality of planes that has a lowest quantity of blocks available for writing relative to the other planes in the plurality of planes. The operations of 510 may be performed in accordance with examples as disclosed herein. In some examples, aspects of the operations of 510 may be performed by a controller 425 as described with reference to FIG. 4.

At 515, the method may include writing the set of data to a subset of the plurality of planes that excludes at least the plane based at least in part on the plane having the lowest quantity of blocks available for writing. The operations of 515 may be performed in accordance with examples as disclosed herein. In some examples, aspects of the operations of 515 may be performed by a write circuitry 430 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for selecting a memory die for writing a set of data, the memory die including a plurality of planes each including a respective plurality of blocks of memory cells; determining, based at least in part on selecting the memory die, a plane of the plurality of planes that has a lowest quantity of blocks available for writing relative to the other planes in the plurality of planes; and writing the set of data to a subset of the plurality of planes that excludes at least the plane based at least in part on the plane having the lowest quantity of blocks available for writing.

Aspect 2: The method, apparatus, or non-transitory computer-readable medium of aspect 1 where a block that is available for writing includes a block that is in an erased state or that stores invalid data.

Aspect 3: The method, apparatus, or non-transitory computer-readable medium of any of aspects 1 through 2, further including operations, features, circuitry, logic, means, or instructions, or any combination thereof for determining a second plane of the plurality of planes that has a highest quantity of blocks available for writing relative to the other planes in the plurality of planes, where the plane is excluded from writing the set of data based at least in part on a difference between the lowest quantity and the highest quantity satisfying a threshold.

Aspect 4: The method, apparatus, or non-transitory computer-readable medium of any of aspects 1 through 3, further including operations, features, circuitry, logic, means, or instructions, or any combination thereof for determining, based at least in part on selecting the memory die, a second plane of the plurality of planes that has the lowest quantity of blocks available for writing, where the second plane is excluded from the subset of the plurality of planes for writing the set of data based at least in part on the second plane having the lowest quantity of blocks available for writing.

Aspect 5: The method, apparatus, or non-transitory computer-readable medium of any of aspects 1 through 4, further including operations, features, circuitry, logic, means, or instructions, or any combination thereof for determining a second plane of the plurality of planes that has the lowest quantity of blocks available for writing, where the second plane is included in the subset of the plurality of planes for writing the set of data based at least in part on a quantity of the plurality of planes of the memory die.

Aspect 6: The method, apparatus, or non-transitory computer-readable medium of any of aspects 1 through 5, further including operations, features, circuitry, logic, means, or instructions, or any combination thereof for determining a second plane of the plurality of planes that has a second lowest quantity of blocks available for writing relative to the other planes in the plurality of planes, where the second plane is excluded from the subset of the plurality of planes for writing the set of data based at least in part on the second plane having the second lowest quantity of blocks available for writing.

Aspect 7: The method, apparatus, or non-transitory computer-readable medium of any of aspects 1 through 6, further including operations, features, circuitry, logic, means, or instructions, or any combination thereof for selecting a set of blocks for writing the set of data based at least in part on plane having the lowest quantity of blocks available for writing, the set of blocks including a block from each plane in the subset of the plurality of planes that excludes at least the plane.

Aspect 8: The method, apparatus, or non-transitory computer-readable medium of aspect 7 where the set of blocks includes blocks with memory cells each of which is configured for storing a first quantity of bits and the method, apparatuses, and non-transitory computer-readable medium, further includes operations, features, circuitry, logic, means, or instructions, or any combination thereof for reading the set of data from a second set of blocks including memory cells each of which is configured for storing a second quantity of bits.

Aspect 9: The method, apparatus, or non-transitory computer-readable medium of any of aspects 7 through 8 where the set of blocks include blocks with memory cells each of which is configured for storing a first quantity of bits and the method, apparatuses, and non-transitory computer-readable medium, further includes operations, features, circuitry, logic, means, or instructions, or any combination thereof for reading the set of data from a second set of blocks including memory cells each of which is configured for storing the first quantity of bits.

Aspect 10: The method, apparatus, or non-transitory computer-readable medium of any of aspects 1 through 9 where the memory die is included in a zoned namespace (ZNS) memory system.

Figure 6:
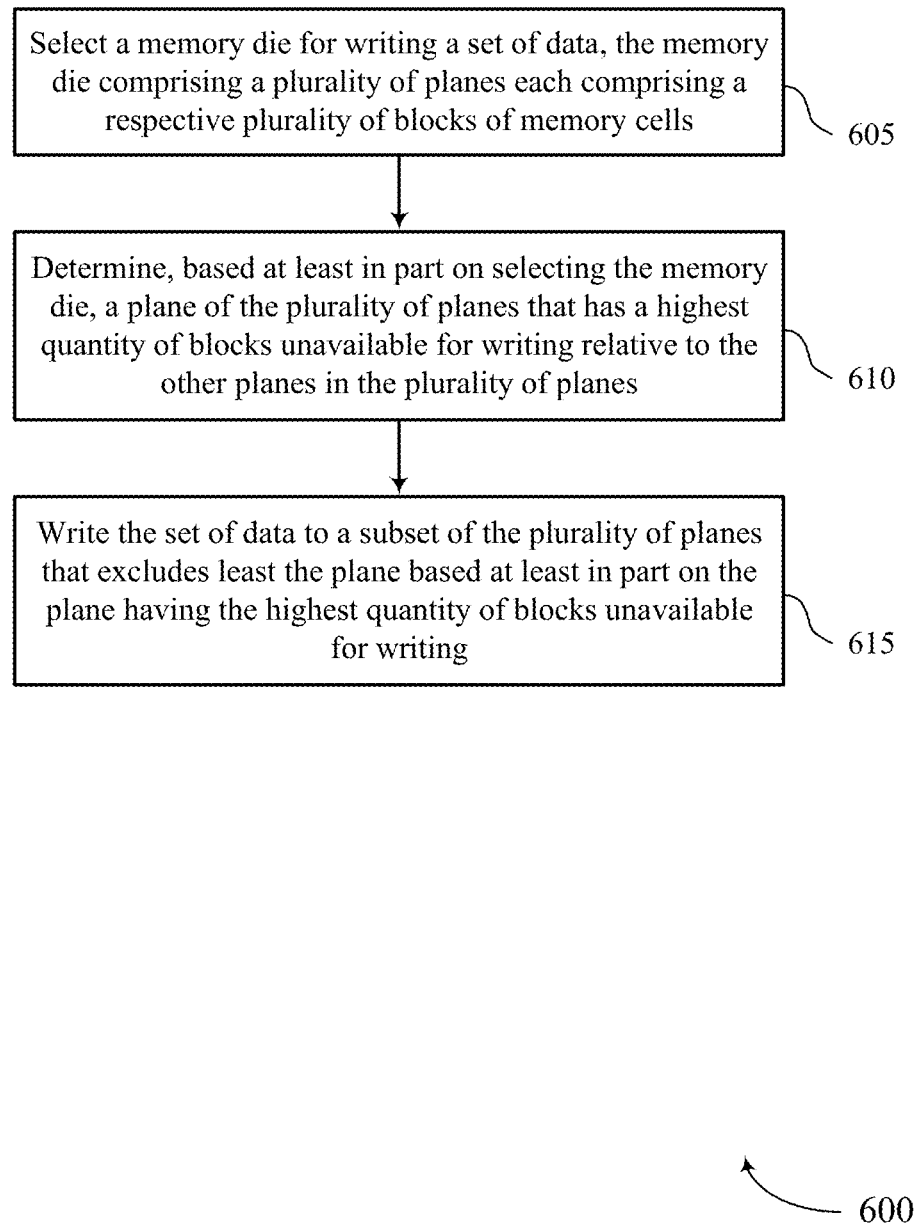

FIG. 6 shows a flowchart illustrating a method 600 that supports plane balancing in a memory system in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include selecting a memory die for writing a set of data, the memory die including a plurality of planes each including a respective plurality of blocks of memory cells. The operations of 605 may be performed in accordance with examples as disclosed herein. In some examples, aspects of the operations of 605 may be performed by a controller 425 as described with reference to FIG. 4.

At 610, the method may include determining, based at least in part on selecting the memory die, a plane of the plurality of planes that has a highest quantity of blocks unavailable for writing relative to the other planes in the plurality of planes. The operations of 610 may be performed in accordance with examples as disclosed herein. In some examples, aspects of the operations of 610 may be performed by a controller 425 as described with reference to FIG. 4.

At 615, the method may include writing the set of data to a subset of the plurality of planes that excludes least the plane based at least in part on the plane having the highest quantity of blocks unavailable for writing. The operations of 615 may be performed in accordance with examples as disclosed herein. In some examples, aspects of the operations of 615 may be performed by a write circuitry 430 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for selecting a memory die for writing a set of data, the memory die including a plurality of planes each including a respective plurality of blocks of memory cells; determining, based at least in part on selecting the memory die, a plane of the plurality of planes that has a highest quantity of blocks unavailable for writing relative to the other planes in the plurality of planes; and writing the set of data to a subset of the plurality of planes that excludes least the plane based at least in part on the plane having the highest quantity of blocks unavailable for writing.

Aspect 12: The method, apparatus, or non-transitory computer-readable medium of aspect 11 where a block that is unavailable for writing includes a block that stores valid data or that is included in a list of blocks to avoid accessing.

Aspect 13: The method, apparatus, or non-transitory computer-readable medium of any of aspects 11 through 12, further including operations, features, circuitry, logic, means, or instructions, or any combination thereof for determining a second plane of the plurality of planes that has a lowest quantity of blocks unavailable for writing relative to the other planes in the plurality of planes, where the plane is excluded from writing the set of data based at least in part on a difference between the lowest quantity and the highest quantity satisfying a threshold.

Aspect 14: The method, apparatus, or non-transitory computer-readable medium of any of aspects 11 through 13, further including operations, features, circuitry, logic, means, or instructions, or any combination thereof for determining, based at least in part on selecting the memory die, a second plane of the plurality of planes that has the highest quantity of blocks unavailable for writing, where the second plane is excluded from the subset of the plurality of planes for writing the set of data based at least in part on the second plane having the highest quantity of blocks unavailable for writing.

Aspect 15: The method, apparatus, or non-transitory computer-readable medium of any of aspects 11 through 14, further including operations, features, circuitry, logic, means, or instructions, or any combination thereof for determining a second plane of the plurality of planes that has the highest quantity of blocks unavailable for writing, where the second plane is included in the subset of the plurality of planes for writing the set of data based at least in part on a quantity of the plurality of planes of the memory die.

Aspect 16: The method, apparatus, or non-transitory computer-readable medium of any of aspects 11 through 15, further including operations, features, circuitry, logic, means, or instructions, or any combination thereof for determining a second plane of the plurality of planes that has a second highest quantity of blocks unavailable for writing relative to the other planes in the plurality of planes, where the second plane is excluded from the subset of the plurality of planes for writing the set of data based at least in part on the second plane having the second highest quantity of blocks unavailable for writing.

Aspect 17: The method, apparatus, or non-transitory computer-readable medium of any of aspects 11 through 16, further including operations, features, circuitry, logic, means, or instructions, or any combination thereof for selecting a set of blocks for writing the set of data based at least in part on plane having the highest quantity of blocks unavailable for writing, the set of blocks including a block from each plane in the subset of the plurality of planes that excludes at least the plane.

Aspect 18: The method, apparatus, or non-transitory computer-readable medium of aspect 17 where the set of blocks includes blocks with memory cells each of which is configured for storing a first quantity of bits and the method, apparatuses, and non-transitory computer-readable medium, further includes operations, features, circuitry, logic, means, or instructions, or any combination thereof for reading the set of data from a second set of blocks including memory cells each of which is configured for storing a second quantity of bits.

Aspect 19: The method, apparatus, or non-transitory computer-readable medium of any of aspects 17 through 18 where the set of blocks include blocks with memory cells each of which is configured for storing a first quantity of bits and the method, apparatuses, and non-transitory computer-readable medium, further includes operations, features, circuitry, logic, means, or instructions, or any combination thereof for reading the set of data from a second set of blocks including memory cells each of which is configured for storing the first quantity of bits.

Figure 7:
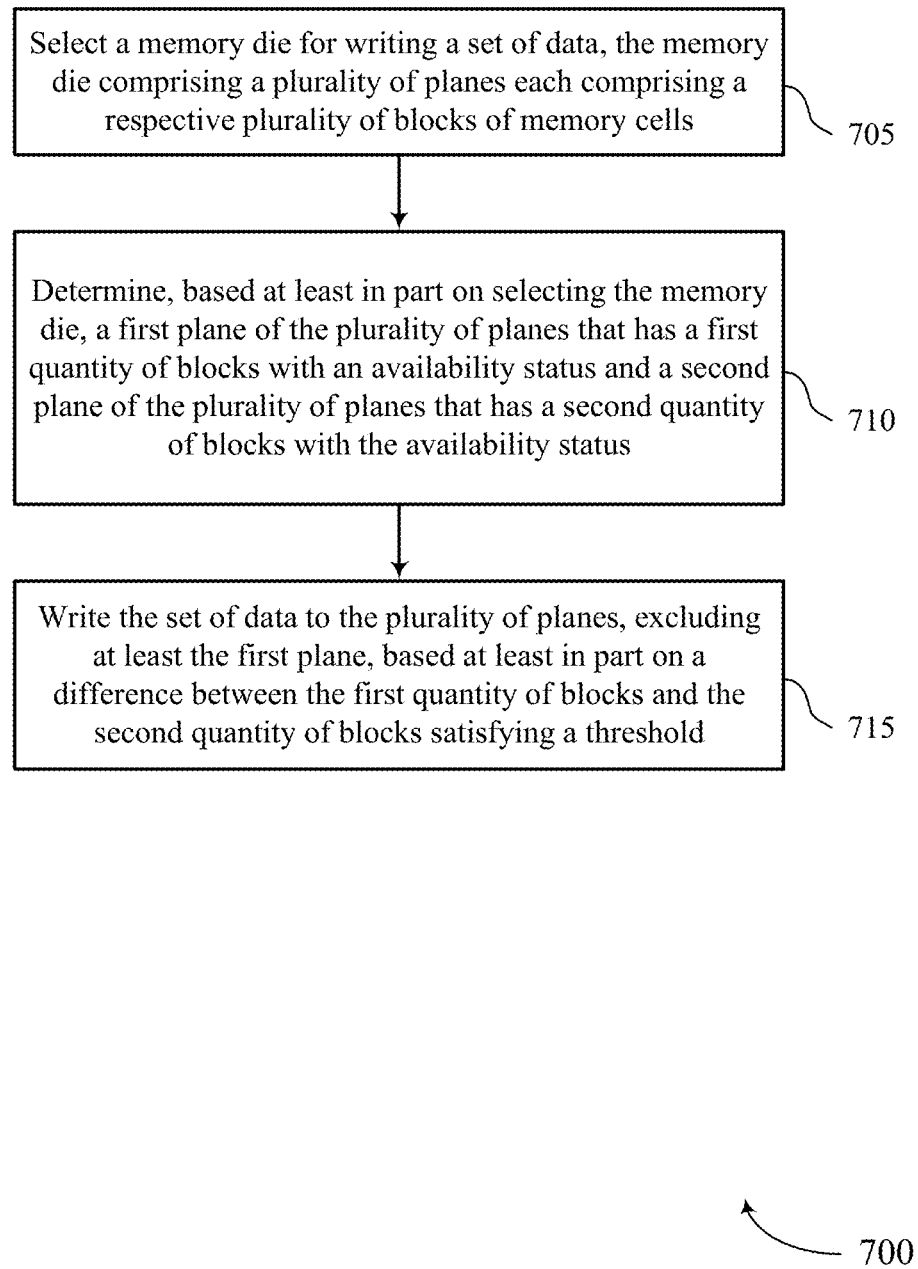

FIG. 7 shows a flowchart illustrating a method 700 that supports plane balancing in a memory system in accordance with examples as disclosed herein. The operations of method 700 may be implemented by a memory system or its components as described herein. For example, the operations of method 700 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 705, the method may include selecting a memory die for writing a set of data, the memory die including a plurality of planes each including a respective plurality of blocks of memory cells. The operations of 705 may be performed in accordance with examples as disclosed herein. In some examples, aspects of the operations of 705 may be performed by a controller 425 as described with reference to FIG. 4.

At 710, the method may include determining, based at least in part on selecting the memory die, a first plane of the plurality of planes that has a first quantity of blocks with an availability status and a second plane of the plurality of planes that has a second quantity of blocks with the availability status. The operations of 710 may be performed in accordance with examples as disclosed herein. In some examples, aspects of the operations of 710 may be performed by a controller 425 as described with reference to FIG. 4.

At 715, the method may include writing the set of data to the plurality of planes, excluding at least the first plane, based at least in part on a difference between the first quantity of blocks and the second quantity of blocks satisfying a threshold. The operations of 715 may be performed in accordance with examples as disclosed herein. In some examples, aspects of the operations of 715 may be performed by a write circuitry 430 as described with reference to FIG. 4.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 20: A method, apparatus, or non-transitory computer-readable medium including operations, features, circuitry, logic, means, or instructions, or any combination thereof for selecting a memory die for writing a set of data, the memory die including a plurality of planes each including a respective plurality of blocks of memory cells; determining, based at least in part on selecting the memory die, a first plane of the plurality of planes that has a first quantity of blocks with an availability status and a second plane of the plurality of planes that has a second quantity of blocks with the availability status; and writing the set of data to the plurality of planes, excluding at least the first plane, based at least in part on a difference between the first quantity of blocks and the second quantity of blocks satisfying a threshold.

Aspect 21: The method, apparatus, or non-transitory computer-readable medium of aspect 20 where the availability status includes the blocks being available for writing and a block is available for writing if the block is in an erased state or stores invalid data.

Aspect 22: The method, apparatus, or non-transitory computer-readable medium of any of aspects 20 through 21 where the availability status includes the blocks being unavailable for writing and a block is unavailable for writing if the block stores valid data or is included in a list of blocks to avoid accessing.

Aspect 23: The method, apparatus, or non-transitory computer-readable medium of any of aspects 20 through 22, further including operations, features, circuitry, logic, means, or instructions, or any combination thereof for excluding a third plane of the plurality of planes from writing the set of data based at least in part on a difference between a third quantity of blocks of the third plane with the availability status and the second quantity of blocks satisfying the threshold.

Aspect 24: The method, apparatus, or non-transitory computer-readable medium of any of aspects 20 through 23, further including operations, features, circuitry, logic, means, or instructions, or any combination thereof for selecting a set of blocks for writing the set of data based at least in part on plane having the highest quantity of blocks unavailable for writing, the set of blocks including a block from each plane of the plurality of planes except for the plane.

Aspect 25: The method, apparatus, or non-transitory computer-readable medium of aspect 24 where the set of blocks includes blocks with memory cells each of which is configured for storing a first quantity of bits and the method, apparatuses, and non-transitory computer-readable medium, further includes operations, features, circuitry, logic, means, or instructions, or any combination thereof for reading the set of data from a second set of blocks including memory cells each of which is configured for storing a second quantity of bits.

Aspect 26: The method, apparatus, or non-transitory computer-readable medium of any of aspects 24 through 25 where the set of blocks includes blocks with memory cells each of which is configured for storing a first quantity of bits and the method, apparatuses, and non-transitory computer-readable medium, further includes operations, features, circuitry, logic, means, or instructions, or any combination thereof for reading the set of data from a second set of blocks including memory cells each of which is configured for storing the first quantity of bits.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 27: An apparatus, including: a memory die; and a controller coupled with the memory die and configured to cause the apparatus to: select the memory die to which to write a set of data, the memory die including a plurality of planes each including a respective plurality of blocks of memory cells; determine, based at least in part on selecting the memory die, a plane of the plurality of planes that has a lowest quantity of blocks available for writing relative to the other planes in the plurality of planes; and write the set of data to a subset of the plurality of planes that excludes at least the plane based at least in part on the plane having the lowest quantity of blocks available for writing.

Aspect 28: The apparatus of aspect 27, where the controller is further configured to cause the apparatus to: determine a second plane of the plurality of planes that has a highest quantity of blocks available for writing relative to the other planes in the plurality of planes, where the plane is excluded from writing the set of data based at least in part on a difference between the lowest quantity and the highest quantity satisfying a threshold.

An apparatus is described. The following provides an overview of aspects of the apparatus as described herein:

Aspect 29: An apparatus, including: a memory die; and a controller coupled with the memory die and configured to cause the apparatus to: select a memory die to which to write a set of data, the memory die including a plurality of planes each including a respective plurality of blocks of memory cells; determine, based at least in part on selecting the memory die, a plane of the plurality of planes that has a highest quantity of blocks unavailable for writing relative to the other planes in the plurality of planes; and write the set of data to a subset of the plurality of planes that excludes at least the plane based at least in part on the plane having the highest quantity of blocks unavailable for writing.

Aspect 30: The apparatus of aspect 29, where the controller is further configured to cause the apparatus to: determine a second plane of the plurality of planes that has a lowest quantity of blocks unavailable for writing relative to the other planes in the plurality of planes, where the plane is excluded from writing the set of data based at least in part on a difference between the lowest quantity and the highest quantity satisfying a threshold.

An apparatus is described. The following provides an overview of aspects of the apparatus as described herein:

Aspect 31: An apparatus, including: a memory die; and a controller coupled with the memory die and configured to cause the apparatus to: select a memory die to which to write a set of data, the memory die including a plurality of planes each including a respective plurality of blocks of memory cells; determine, based at least in part on selecting the memory die, a first plane of the plurality of planes that has a first quantity of blocks with an availability status and a second plane of the plurality of planes that has a second quantity of blocks with the availability status; and write the set of data to the plurality of planes, excluding at least the first plane, based at least in part on a difference between the first quantity of blocks and the second quantity of blocks satisfying a threshold.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    selecting a memory die for a parallel write operation for a set of data, the memory die comprising a set of planes;
    determining, based at least in part on the memory die being selected for the parallel write operation, a first plane of the set of planes that has a first quantity of blocks with a first availability status for writing;
    determining, based at least in part on the first quantity of blocks with the first availability status that a condition for excluding the first plane from the parallel write operation is satisfied; and
    excluding at least the first plane from the parallel write operation based at least in part on the condition for excluding the first plane being satisfied.

2. The method of claim 1, further comprising:
    determining, based at least in part on the first quantity of blocks, that a second condition for excluding at least the first plane from the parallel write operation is satisfied, wherein at least the first plane is excluded from the parallel write operation based at least in part on the second condition being satisfied.

3. The method of claim 1, further comprising:
    determining, based at least in part on a second quantity of blocks with the first availability status of a second plane of the set of planes, that a condition for excluding at least the second plane from the parallel write operation is satisfied; and
    excluding at least the second plane of the set of planes from the parallel write operation based at least in part on the condition for excluding at least the second plane being satisfied.

4. The method of claim 3, further comprising:
    determining a quantity of planes in the memory die selected for the parallel write operation, wherein at least the second plane is excluded from the parallel write operation based at least in part on the quantity of planes.

5. The method of claim 1, wherein the first quantity of blocks comprises unavailable blocks for writing, and wherein determining that the condition is satisfied comprises:
    determining that the first plane has a highest quantity of unavailable blocks relative to other planes in the set of planes, wherein a block is unavailable for writing if the block stores valid data or is included in a list of blocks to avoid accessing.

6. The method of claim 5, further comprising:
    determining, based at least in part on the memory die being selected for the parallel write operation, a second plane of the set of planes with a lowest quantity of unavailable blocks; and
    determining that a difference between the highest quantity of unavailable blocks and the lowest quantity of unavailable blocks satisfies a threshold difference, wherein at least the first plane is excluded from the parallel write operation based at least in part on the difference satisfying the threshold difference.

7. The method of claim 1, wherein the first quantity of blocks comprises available blocks for writing, and wherein determining that the condition is satisfied comprises:
    determining that the first plane has a lowest quantity of available blocks relative to other planes in the set of planes, wherein a block is available for writing if the block is in an erased state or stores invalid data.

8. The method of claim 7, further comprising:
    determining, based at least in part on the memory die being selected for the parallel write operation, a second plane of the set of planes with a highest quantity of available blocks; and
    determining that a difference between the lowest quantity of available blocks and the highest quantity of available blocks satisfies a threshold difference, wherein at least the first plane is excluded from the parallel write operation based at least in part on the difference satisfying the threshold difference.

9. The method of claim 1, wherein first quantity of blocks comprises unavailable blocks for writing, and wherein determining that the condition is satisfied comprises:

determining that a ratio of the first quantity of blocks relative to a second quantity of blocks comprising available blocks for writing satisfies a threshold ratio.

10. A memory system, comprising:
one or more memory dies; and
one or more controllers coupled with the one or more memory dies and configured to cause the memory system to:
 select a memory die for a parallel write operation for a set of data, the memory die comprising a set of planes;
 determine, based at least in part on the memory die being selected for the parallel write operation, a first plane of the set of planes that has a first quantity of blocks with a first availability status for writing;
 determine, based at least in part on the first quantity of blocks with the first availability status that a condition for excluding at least the first plane from the parallel write operation is satisfied; and
 exclude at least the first plane from the parallel write operation based at least in part on the condition for excluding at least the first plane being satisfied.

11. The memory system of claim 10, wherein the one or more controllers is further configured to cause the memory system to:
 determine, based at least in part on the first quantity of blocks, that a second condition for excluding at least the first plane from the parallel write operation is satisfied, wherein at least the first plane is excluded from the parallel write operation based at least in part on the second condition being satisfied.

12. The memory system of claim 10, wherein the one or more controllers is further configured to cause the memory system to:
 determine, based at least in part on a second quantity of blocks with the first availability status of a second plane of the set of planes, that a condition for excluding at least the second plane from the parallel write operation is satisfied; and
 exclude at least the second plane of the set of planes from the parallel write operation based at least in part on the condition for excluding at least the second plane being satisfied.

13. The memory system of claim 12, wherein the one or more controllers is further configured to cause the memory system to:
 determine a quantity of planes in the memory die selected for the parallel write operation, wherein at least the second plane is excluded from the parallel write operation based at least in part on the quantity of planes.

14. The memory system of claim 10, wherein the first quantity of blocks comprises unavailable blocks for writing, and wherein the one or more controllers is further configured to cause the memory system to determine that the condition is satisfied by being configured to cause the memory system to:
 determine that the first plane has a highest quantity of unavailable blocks relative to other planes in the set of planes, wherein a block is unavailable for writing if the block stores valid data or is included in a list of blocks to avoid accessing.

15. The memory system of claim 14, wherein the one or more controllers is further configured to cause the memory system to:
 determine, based at least in part on the memory die being selected for the parallel write operation, a second plane of the set of planes with a lowest quantity of unavailable blocks; and
 determine that a difference between the highest quantity of unavailable blocks and the lowest quantity of unavailable blocks satisfies a threshold difference, wherein at least the first plane is excluded from the parallel write operation based at least in part on the difference satisfying the threshold difference.

16. The memory system of claim 10, wherein the first quantity of blocks comprises available blocks for writing, and wherein the one or more controllers is further configured to cause the memory system to determine that the condition is satisfied by being configured to cause the memory system to:
 determine that the first plane has a lowest quantity of available blocks relative to other planes in the set of planes, wherein a block is available for writing if the block is in an erased state or stores invalid data.

17. The memory system of claim 16, wherein the one or more controllers is further configured to cause the memory system to:
 determine, based at least in part on the memory die being selected for the parallel write operation, a second plane of the set of planes with a highest quantity of available blocks; and
 determine that a difference between the lowest quantity of available blocks and the highest quantity of available blocks satisfies a threshold difference, wherein at least the first plane is excluded from the parallel write operation based at least in part on the difference satisfying the threshold difference.

18. The memory system of claim 10, wherein first quantity of blocks comprises unavailable blocks for writing, and wherein the one or more controllers is further configured to cause the memory system to determine that the condition is satisfied by being configured to cause the memory system to:
 determine that a ratio of the first quantity of blocks relative to a second quantity of blocks comprising available blocks for writing satisfies a threshold ratio.

19. A non-transitory computer-readable medium storing code comprising instructions which, when executed by processing circuitry of a memory system, cause the memory system to:
 select a memory die for a parallel write operation for a set of data, the memory die comprising a set of planes;
 determine, based at least in part on the memory die being selected for the parallel write operation, a first plane of the set of planes that has a first quantity of blocks with a first availability status for writing;
 determine, based at least in part on the first quantity of blocks with the first availability status that a condition for excluding at least the first plane from the parallel write operation is satisfied; and
 exclude at least the first plane from the parallel write operation based at least in part on the condition for excluding at least the first plane being satisfied.

20. The non-transitory computer-readable medium of claim 19, further comprising instructions which, when executed by the processing circuitry of the memory system, cause the memory system to:
 determine, based at least in part on the first quantity of blocks, that a second condition for excluding at least the first plane from the parallel write operation is satisfied, wherein at least the first plane is excluded from the parallel write operation based at least in part on the second condition being satisfied.

\* \* \* \* \*